United States Patent
Crovella et al.

(10) Patent No.: US 8,869,276 B2
(45) Date of Patent: Oct. 21, 2014

(54) METHOD AND APPARATUS FOR WHOLE-NETWORK ANOMALY DIAGNOSIS AND METHOD TO DETECT AND CLASSIFY NETWORK ANOMALIES USING TRAFFIC FEATURE DISTRIBUTIONS

(75) Inventors: Mark Crovella, Scituate, MA (US); Anukool Lakhina, Boston, MA (US)

(73) Assignee: Trustees of Boston University, Boston, MA (US)

( * ) Notice: Subject to any disclaimer, the term of this patent is extended or adjusted under 35 U.S.C. 154(b) by 1626 days.

(21) Appl. No.: 11/988,056

(22) PCT Filed: Jun. 29, 2006

(86) PCT No.: PCT/US2006/025398
§ 371 (c)(1),
(2), (4) Date: Dec. 3, 2009

(87) PCT Pub. No.: WO2007/002838
PCT Pub. Date: Jan. 4, 2007

(65) Prior Publication Data
US 2010/0071061 A1 Mar. 18, 2010

Related U.S. Application Data

(60) Provisional application No. 60/694,853, filed on Jun. 29, 2005, provisional application No. 60/694,840, filed on Jun. 29, 2005.

(51) Int. Cl.
| | |
|---|---|
| G06F 12/14 | (2006.01) |
| G06F 17/00 | (2006.01) |
| H04L 29/06 | (2006.01) |
| H04L 9/32 | (2006.01) |
| H04L 12/26 | (2006.01) |
| H04L 12/24 | (2006.01) |

(52) U.S. Cl.
CPC ........... *H04L 63/1425* (2013.01); *H04L 41/046* (2013.01); *H04L 43/022* (2013.01); *H04L 43/16* (2013.01)
USPC ............... 726/23; 726/13; 713/151; 713/153; 713/168

(58) Field of Classification Search
USPC ....................... 726/23, 13; 713/151, 153, 168
See application file for complete search history.

(56) References Cited

U.S. PATENT DOCUMENTS 6,321,338 B1    11/2001   Porras et al.
(Continued)

FOREIGN PATENT DOCUMENTS

WO    WO 03/001333 A2    1/2003

OTHER PUBLICATIONS

Hood, C. et al. Proactive Network Fault Detection. In Proc IEEE INFOCOM., vol. 3, pp. 1147-1155, 1997.

*Primary Examiner* — Aravind Moorthy
(74) *Attorney, Agent, or Firm* — Bingham McCutchen LLP

(57) ABSTRACT

To improve network reliability and management in today's high-speed communication networks, we propose an intelligent system using adaptive statistical approaches. The system learns the normal behavior of the network. Deviations from the norm are detected and the information is combined in the probabilistic framework of a Bayesian network. The proposed system is thereby able to detect unknown or unseen faults. As demonstrated on real network data, this method can detect abnormal behavior before a fault actually occurs, giving the network management system (human or automated) the ability to avoid a potentially serious problem.

14 Claims, 14 Drawing Sheets

(56) References Cited

U.S. PATENT DOCUMENTS

| | | | |
|---|---|---|---|
| 8,220,052 B2* | 7/2012 | Huynh et al. | 726/23 |
| 2004/0168100 A1 | 8/2004 | Thottan et al. | |
| 2005/0018618 A1* | 1/2005 | Mualem et al. | 370/252 |
| 2005/0111367 A1* | 5/2005 | Jonathan Chao et al. | 370/235 |
| 2006/0137009 A1* | 6/2006 | Chesla | 726/22 |
| 2006/0294588 A1* | 12/2006 | Lahann et al. | 726/23 |

* cited by examiner

Each circle is an anomaly in 2D. Bounds around groups are results of clusters

Residual Port

Residual IP Addresses

| ID | # points | Plurality Label | $\overline{H}$(srcIP) | $\overline{H}$(srcPort) | $\overline{H}$(dstIP) | $\overline{H}$(dstPort) |
|---|---|---|---|---|---|---|
| 1 | 191 | Alpha | - | 0 | - | - |
| 2 | 53 | Network Scan | 0 | + | 0 | 0 |
| 3 | 35 | Port Scan | - | + | - | + |
| 4 | 30 | Port Scan | 0 | - | 0 | + |
| 5 | 24 | Alpha | 0 | 0 | + | 0 |
| 6 | 22 | Outage | 0 | 0 | 0 | + |
| 7 | 22 | Alpha | - | 0 | - | 0 |
| 8 | 8 | Point Multipoint | 0 | 0 | 0 | + |
| 9 | 8 | Flash Crowd | 0 | 0 | 0 | - |
| 10 | 4 | Alpha | 0 | - | 0 | 0 |

METHOD AND APPARATUS FOR WHOLE-NETWORK ANOMALY DIAGNOSIS AND METHOD TO DETECT AND CLASSIFY NETWORK ANOMALIES USING TRAFFIC FEATURE DISTRIBUTIONS

CROSS REFERENCE TO RELATED APPLICATIONS

This application claims the benefit under 35 U.S.C. §119 (e) of U.S. Provisional Patent Application No. 60/694,853 and 60/694,840 both filed on Jun. 29, 2005 and the disclosures of both of which are incorporated by reference herein.

STATEMENT REGARDING FEDERALLY SPONSORED RESEARCH OR DEVELOPMENT

This invention was developed with support in part from the National Science Foundation grants numbered ANI-9986397 and CCR-0325701.

BACKGROUND OF THE INVENTION

A network anomaly is an unusual event in a network that is of interest to an entity such as a network provider, a network user, a network operator, or a law enforcement agency. A network anomaly may be created unintentionally as a result of normal network traffic conditions, such as a breakdown in a network resource. A network anomaly may also be created intentionally by a malicious attack by a hacker or a person acting to damage the network or impair the performance of the network.

Typically, a network anomaly is monitored, or analyzed, by collecting data from a network element such a single link or a single router of the network. Such data collection is done in isolation from other network data or other network elements. In other words, finding a network anomaly is closely related to a link-level traffic characterization.

Another approach to monitor or analyze a network anomaly treats a network anomaly as a deviation in traffic volume. This enables detection of a network anomaly that visually stands out, but a low-rate network anomaly (e.g., worms, port-scans, small outage events, etc.) are not detected by an approach based on traffic volume.

Still another approach to monitor or analyze a network anomaly is a manual method where a rule is developed. A match or a violation of the rule decides whether a network anomaly has been encountered. However, rule-based methods cannot detect new, previously unseen anomalies.

Many current methods provide a solution, for an element of the network, for each class of a network anomaly, whereas a solution for many elements of a network is preferable.

BRIEF SUMMARY OF THE INVENTION

The present invention relates to methods and apparatus for detecting, monitoring, or analyzing an unusual network event or a network anomaly in a communication network and the business of so doing for the benefit of others. Embodiments of the present invention can detect, monitor, or analyze the network anomaly by applying many statistical and mathematical methods. Embodiments of the present invention include both methods and apparatus to detect, monitor, or analyze the network anomaly. These include classification and localization.

The invention is a general technique for detecting and classifying unusual events (anomalies) in a network in an efficient, continuous manner. The technique is founded on analyzing the distributional properties of multiple features (addresses, ports, etc.) of network-wide traffic. This distributional analysis of traffic features has two key elements for the classification of network anomalies into meaningful clusters.

Network traffic is analyzed for distributions of multiple traffic features (addresses, ports, protocol, etc.) simultaneously. Anomaly detection using feature distribution is highly-sensitive and augments volume-based detections, by exposing low-rate important anomalies that cannot be detected by volume-based methods.

Feature distributions of network traffic are created to extract structural knowledge about an anomaly. This structural knowledge of anomalies is used to classify anomalies into distinct clusters that are structurally and semantically meaningful. The classification of anomalies is achieved by an unsupervised approach, so no human intervention or a priori knowledge is needed to categorize anomalies. This unsupervised approach allows the invention to recognize and classify novel (previously unseen) anomalies (e.g., new worms).

Moreover, the invention analyzes multiple features of network-wide data, i.e., data that is collected from multiple resources in a network. Network-wide analysis enables the detection of anomalies that span across a network. Network-wide analysis, coupled with the feature distribution analysis, allows the invention to detect and classify network-wide anomalies, augmenting detections by current schemes that are predominantly volume-based analysis of single-resource data.

Systematic analysis of data collected from multiple network resources (i.e., network links, routers, etc.) is a key feature of the invention. By leveraging whole-network data, the invention is able to diagnose a wide-range of anomalies, including those that may span throughout a network. Diagnosis allows identification of the time an anomaly is present, identification of the location of the anomaly in the network, and identification of the anomaly type.

Anomalies can arise for a variety of reasons from abuse (attacks, worms, etc.) to unintentional (equipment failure, human error, etc.). The technique is not restricted to point solutions for each type of anomaly. Instead, by treating anomalies as substantial deviations from established normal behavior, the invention provides a general solution for diagnosing a large class of anomalous events.

One embodiment describes forming a time series having at least one dimension corresponding to communication network traffic handled by network elements and decomposing the time series into several communication network traffic patterns existing in those network elements.

Another embodiment forms a uni- or multi-variate model having at least one dimension corresponding to communication network traffic handled by network elements and detecting an anomaly in a pattern in the communication network traffic.

Still another embodiment finds a deviation in a feature of communication network traffic.

Still another embodiment generates at least a distribution of a communication network traffic feature, estimates an entropy of the communication network traffic feature, sets a threshold of the entropy of the communication network traffic feature, and designates the communication network traffic feature to be anomalous when the entropy of the communication network traffic feature is found to be different from the set threshold of the entropy of the communication network traffic feature.

BRIEF DESCRIPTION OF THE SEVERAL VIEWS OF THE DRAWINGS

These and other features of the invention are described below in the Detailed Description and the accompanying Drawing of which.

DETAILED DESCRIPTION OF THE INVENTION

The present invention relates to methods and apparatus for detecting, monitoring, or analyzing an unusual network event or a network anomaly in a communication network. Embodiments of the present invention illustrate specific statistical techniques to detect, monitor, or analyze the network anomaly, other known techniques can be used. Embodiments of the present invention include both methods and apparatus to detect, monitor, or analyze the network anomaly. As used herein the term whole network when applied to the basis for data collection means at least a substantial part of the network such that the data are meaningful in anomaly detection and analysis.

Figure 1:
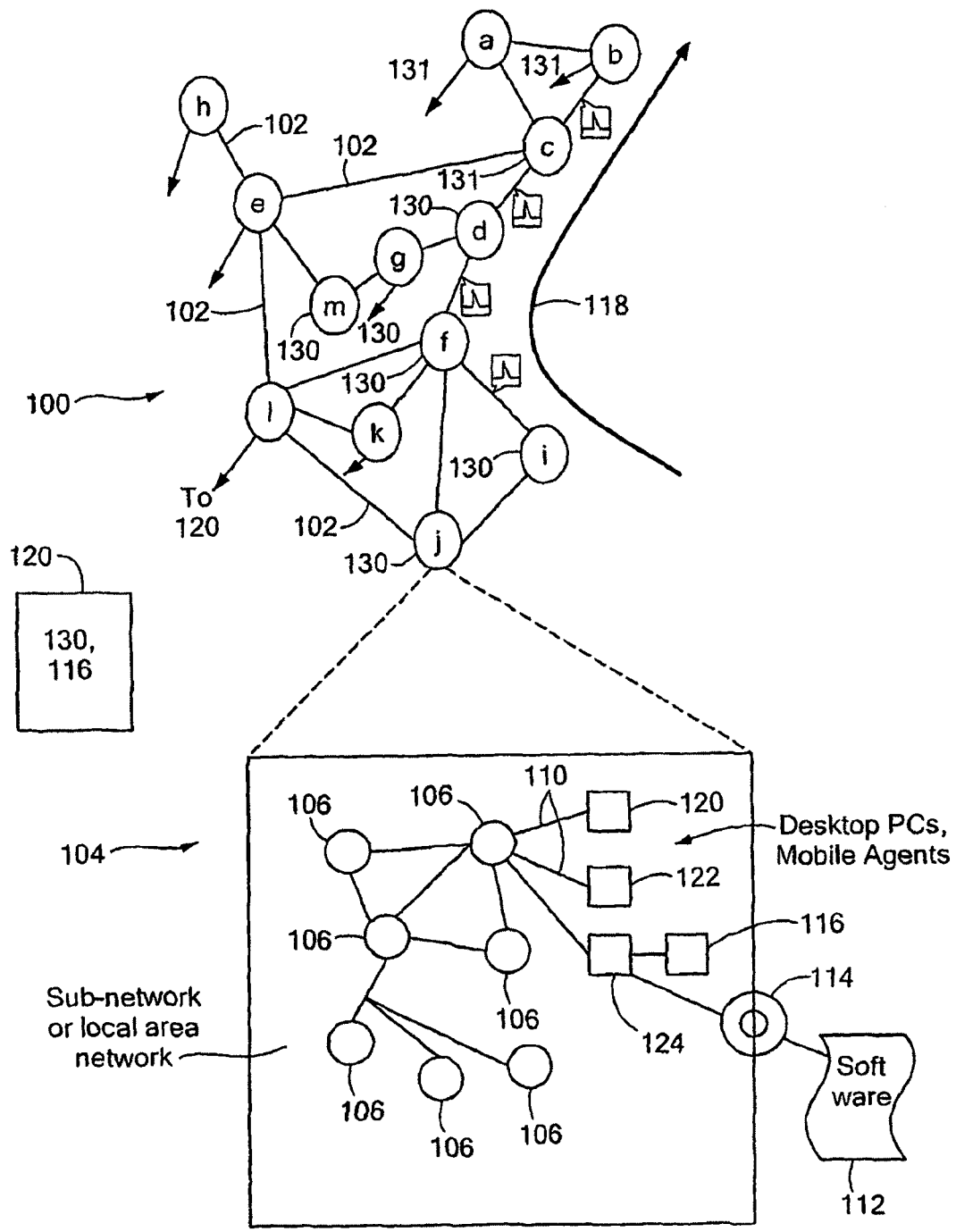
FIG. 1 illustrates a whole network used in the invention for a data source for anomaly detection.

FIG. 1 illustrates a communication network 100. The communication network 100 has network elements, such as nodes a-m with routers, servers, etc. An illustration of the flow of traffic is shown by route 118. The network elements are connected by network links 102 which may be similar or very different in features such as capacity, format, etc. In a given network, there could be more or fewer network elements and network links, in fact in the world of the Internet, this is a simplified picture of reality.

As an illustration, network node j has been shown to be made up of a lower level communication network having a sub-network, a LAN (Local Area Network), personal computers, and mobile agents. Such lower level communication network, shown as represented by network element 104, is made up of (sub)network elements, 106 that may be similar or different in scope, servers, routers or other means. These have network linkages 108 as known in the art. Each sub network element will typically be composed of similar or distinct personal computers 120, or mobile agents 122. These are linked by network links 110 which could be wireless or conventional.

One computational facility 124 in that network could be used to up load the programming 112 of the invention via media 114 to accomplish the data mining for data and/or analysis used in the invention. The analyses of the invention could be done there on data 116 received from the nodes or other elements via paths 130 or elsewhere such as processor 120 that the data 116 are sent. Access to the data is in the hands of the network provided so obtaining the data is possible. If third parties are performing the analysis, access authorization is needed.

It should be noted that the above description is just for an illustrative architecture of the communication network 100. There could be more or fewer of any of the components of the communication network 100 and there could be many layers of lower level for a given network element and a given network link.

Figure 2A:
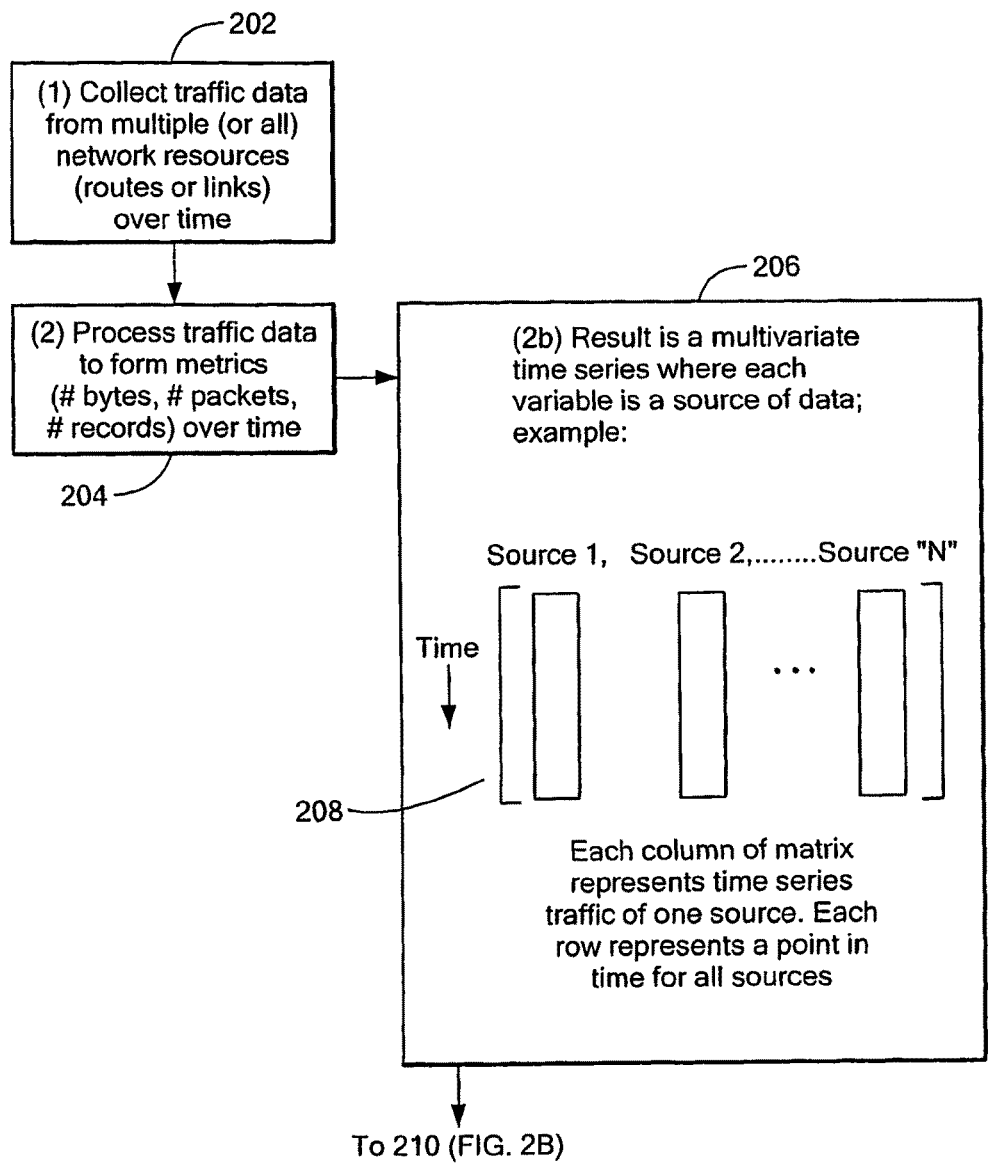
FIGS. 2A-2C illustrate the processing of network data according to one aspect of the invention.
Figure 2B:
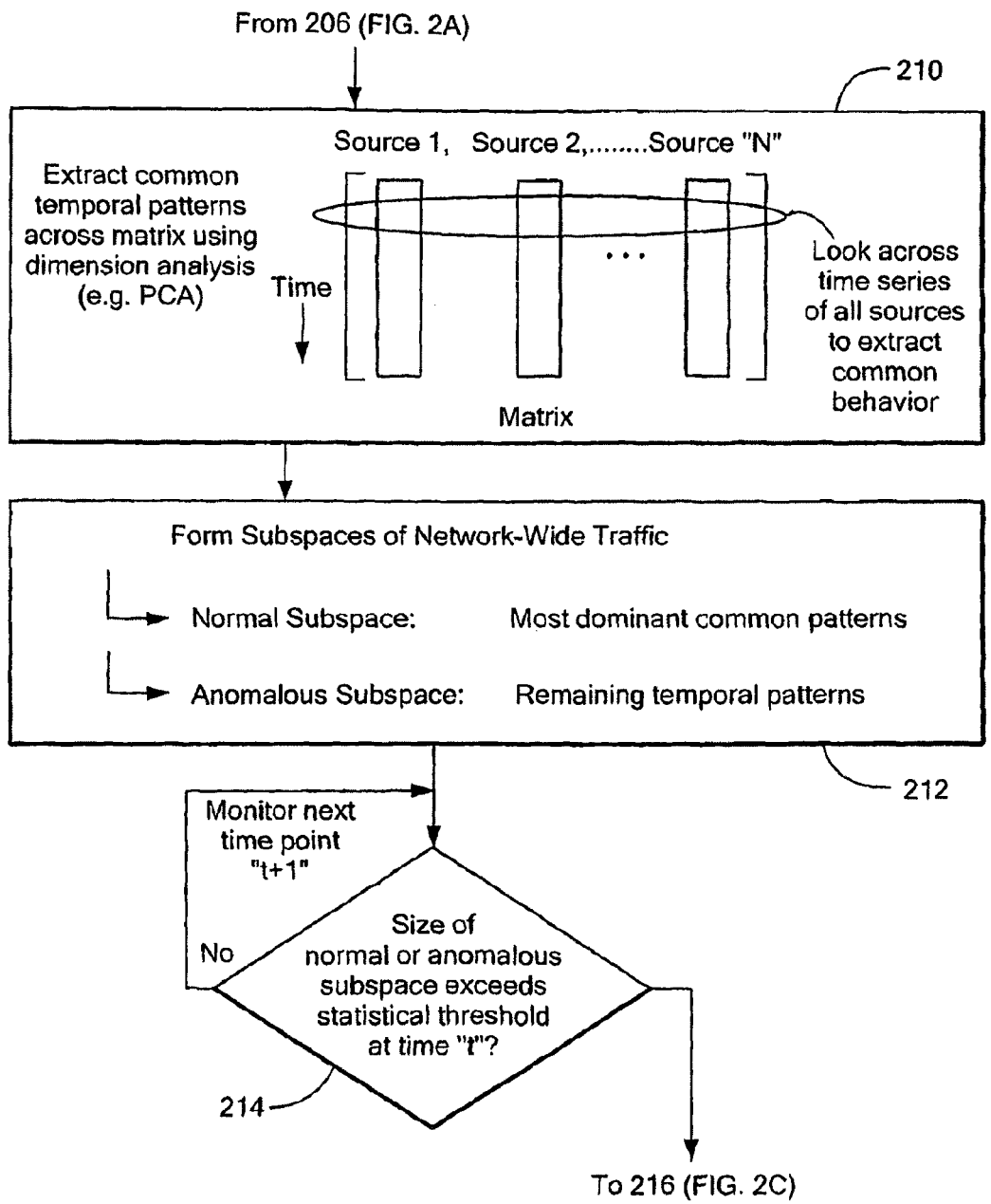
Figure 2C:
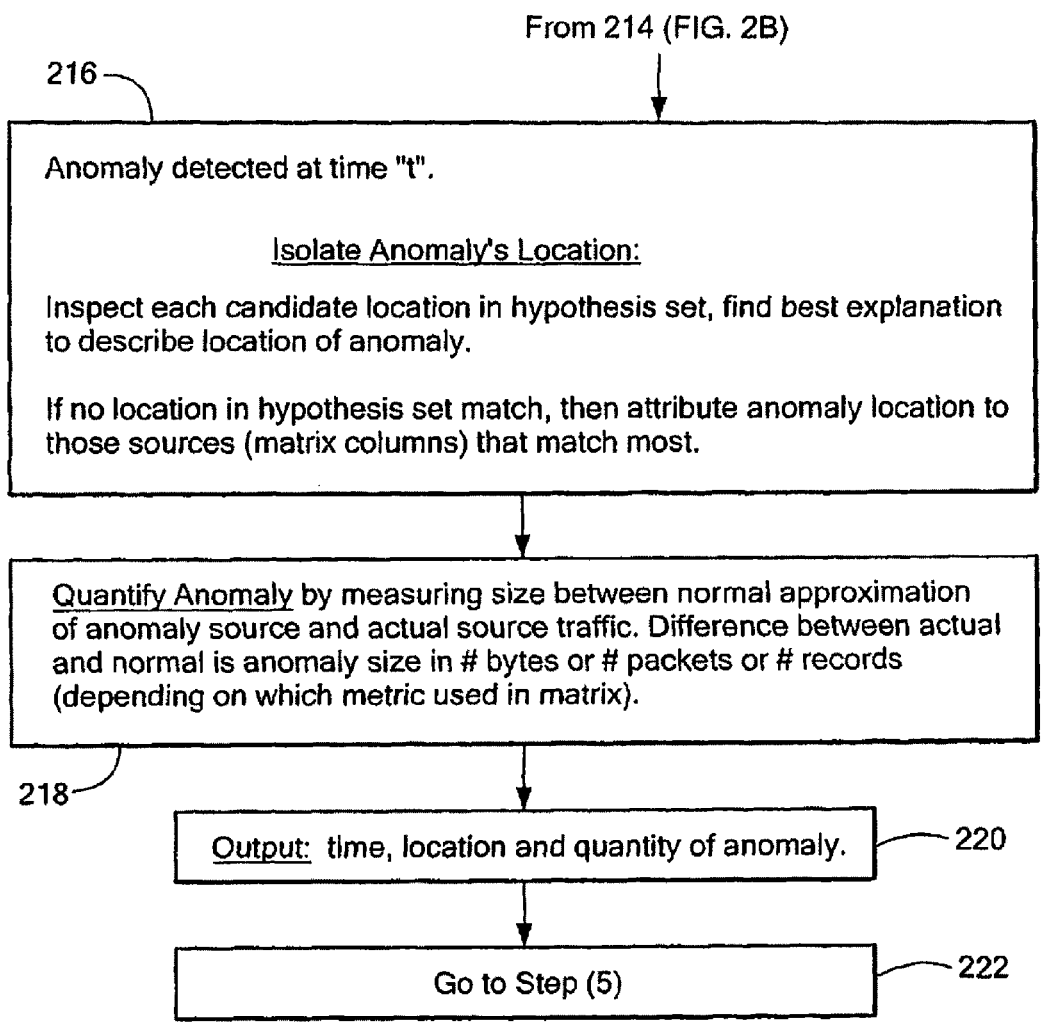

FIGS. 2A-2C illustrate a method for monitoring communication network 100 traffic 118, etc. The monitoring will need to access data throughout the network and as such each node a-m has or needs to give to the monitoring processor(s) access permissions. Huge amounts of data are collected in this step and will typically be organized into matrix form. A collection machine or machines, which could include one or more processing stations 124, is used for this purpose.

In practicing the method, in a step 202, a process of forming a time series is started. The time series is to have at least one dimension corresponding to communication network 100 traffic on several network elements, such as the network nodes in the flow 118 for each of several periods of time. The elements are termed sources for the purpose of this illustration. In step 204, data for the time series are decomposed into several communication network 100 traffic patterns existing in several network elements nodes a-m. Element 206 illustrates the mathematical form of these data once decomposed into a matrix 208, representing a time series.

The matrix 208 has a separate source for each column and each row is data collected for one period of time over which the data were collected. The data include information on such variables of network traffic as the number of bytes of traffic, the number of packets and the number of records. The data include the information of the Internet Provider (IP) used to carry the traffic in each link and the port address, such as a PC 110, within each node. The data reveal a number of features such as source IP and source port as well as destination IP and destination port. All of these data are available in the blocks of network traffic. Data are collected on a link basis, that is on an origin-to-destination, OD, basis.

In FIG. 2B the matrix 208 is processed in step 212 to extract common patterns over time by looking at the levels for each source period by period. From this, normal patterns are extracted. The remaining patterns are considered anomalous. Normal patterns will typically show volume cycling over a regular time such as 24 hours (FIG. 2H). When these types are extracted from the data as a whole, the remaining data will show a nearly random distribution but with a volume peak (230 in FIG. 2I) at a suspected or identified anomaly.

This is done time period by time period so that a step 214 is used to step through all the time periods in the matrix 208. At each iteration, step 214 decides whether the entire set of source data at each time period is above (normal) or below (possibly anomalous) a threshold. The threshold can be preset or updated over time from the data mining results.

When a volume figure exceeds the threshold at one time period, processing turns to FIG. 2C and a step 216 in which each suspected anomaly is evaluated by a hypothesis process in which a number of possible sites are tested in an effort to find a match. This results in either sub step in finding a match for the location or identifying the most likely non matches.

A step 218 analyzes the anomaly found in step 216 by comparing the volume for the suspected source in normal traffic to the anomaly volume. This will give a value in the number of bytes, packets or records for the anomaly at that source. From there a step 220 provides to authorized users the anomaly time, location and quantity. From step 220 a step 222 returns processing back to step 214 for evaluation of the next time period.

Figure 2G:
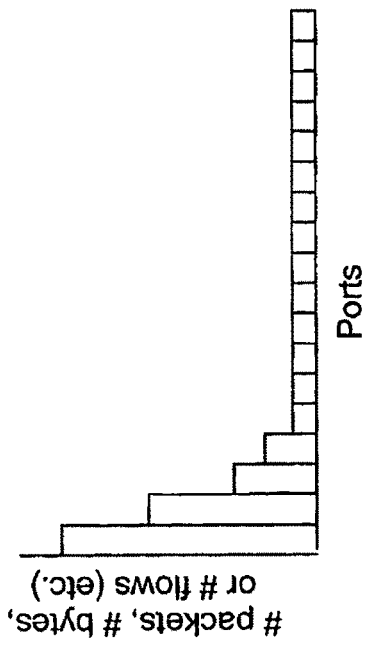
FIGS. 2D-2G are distributions useful in understanding the invention.
Figure 2F:
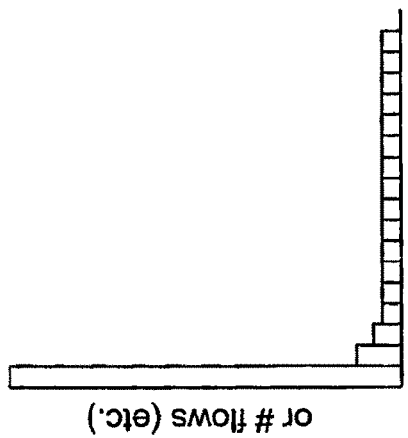
Figure 2E:
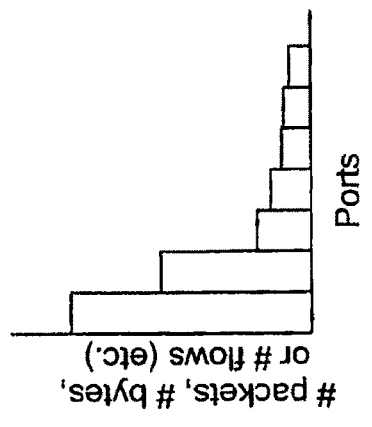
Figure 2D:
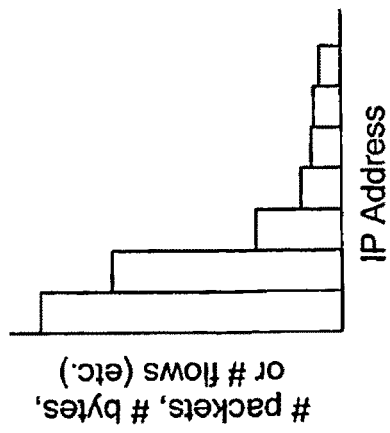
Figure 2H:
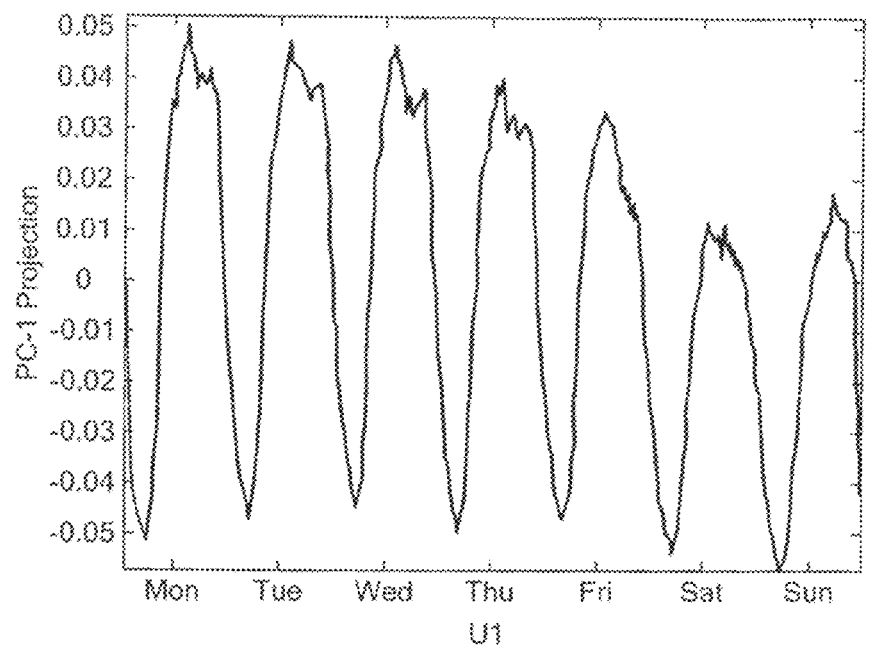
FIG. 2H illustrates data obtained according to the inventions illustrating normal network communication traffic.
Figure 2I:
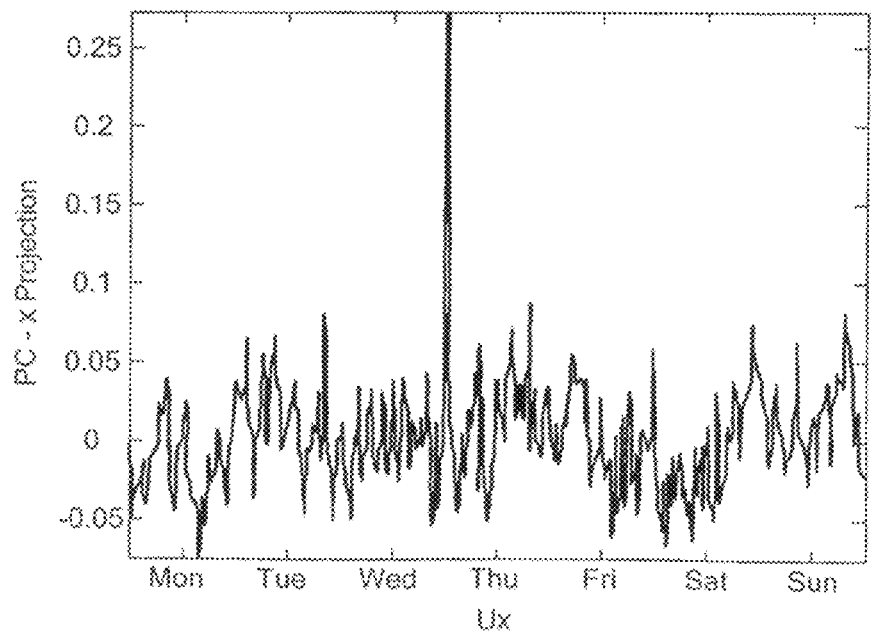
FIG. 2I illustrates data obtained according to the inventions illustrating anomalous network communication traffic.

The volume difference in the distribution of normal and anomalous traffic is shown in FIGS. 2D-2G. FIGS. 2D-2E show normal traffic patterns as a function of detected pockets, bytes (pocket contents) or flows and port respectively. FIGS. 2F-2G show anomalous traffic on the same data sources. FIGS. 2H and 2I show the detected periodic behavior of normal traffic (2H) and the random nature with spike 230 of the residual with suspected anomaly (2I).

To reach this point mathematically, some form of dimensional analysis is typically used. One form used in the invention is PCA (Principle Component Analysis), described below.

PCA is a coordinate transformation method that maps a given set of data points onto new axes. These axes are called the principal axes or principal components. When working with zero-mean data, each principal component has the property that it points in the direction of maximum variance remaining in the data, given the variance already accounted for in the preceding components. As such, the first principal component captures the variance of the data to the greatest degree possible on a single axis. The next principal components then each capture the maximum variance among the remaining orthogonal directions.

We will apply PCA on our link data matrix 208, treating each row of Y. It is necessary to adjust Y so that that its columns have zero mean. This ensures that PCA dimensions capture true variance, and thus avoids skewing results due to differences in mean link utilization. Y will denote the mean-centered link traffic data.

Applying PCA to Y yields a set of m principal components, $\{v_i\}i^m=1$. The first principal component $v_1$ is the vector that points in the direction of maximum variance in Y:

$$v_1 = \mathrm{argmax}_{\|v\|=1} \|Yv\| \quad (1)$$

where $\|Yv\|^2$ is proportional to the variance of the data measured along v. Proceeding iteratively, once the first k−1 principal components have been determined, the k-th principal component corresponds to the maximum variance of the residual. The residual is the difference between the original data and the data mapped onto the first k−1 principal axes. Thus, we can write the k-th principal component $v_k$ as:

$$v_k = \mathrm{argmax}_{\|v\|=1} \left\|\left(Y - \sum_{i=1}^{k-1} Yv_i v_i^T\right)v\right\| \quad (2)$$

An important use of PCA is to explore the intrinsic dimensionality of a set of data points. By examining the amount of variance captured by each principal component, $\|Yv\|^2$, it is possible to ask whether most of the variability in the data can be captured in a space of lower dimension. If only the variance along the first r dimensions is non-negligible, then it is concluded that the pointset represented by Y effectively resides in an r-dimensional subspace of R.

Once the principal axes have been determined, the dataset can be mapped onto the new axes. The mapping of the data to principal axis i is given by $Yv_i$. This vector can be normalized to unit length by dividing it by $\|Yv_i\|$. Thus, for each principal axis i, $$u_i = \frac{Yv_i}{\|Yv_i\|} \quad i=1,\ldots,m. \quad (3)$$

The $u_i$ are vectors of size t and are orthogonal by construction. The above equation shows that all the link counts, when weighted by $v_1$, produce one dimension of the transformed data. Thus vector $u_i$ captures the temporal variation common to the entire ensemble of the link traffic timeseries along principal axis i. Since the principal axes are in order of contribution to overall variance, u1 captures the strongest temporal trend common to all link traffic, u2 captures the next strongest, and so on. The set $\{u_i\}i^4=1$ captures most of the variance and hence the most significant temporal patterns common to the ensemble of all link traffic timeseries. FIGS. 2H and 2I show respectively the strongest principal component, $u_1$, and a component having far less axial prominence.

Figure 2J:
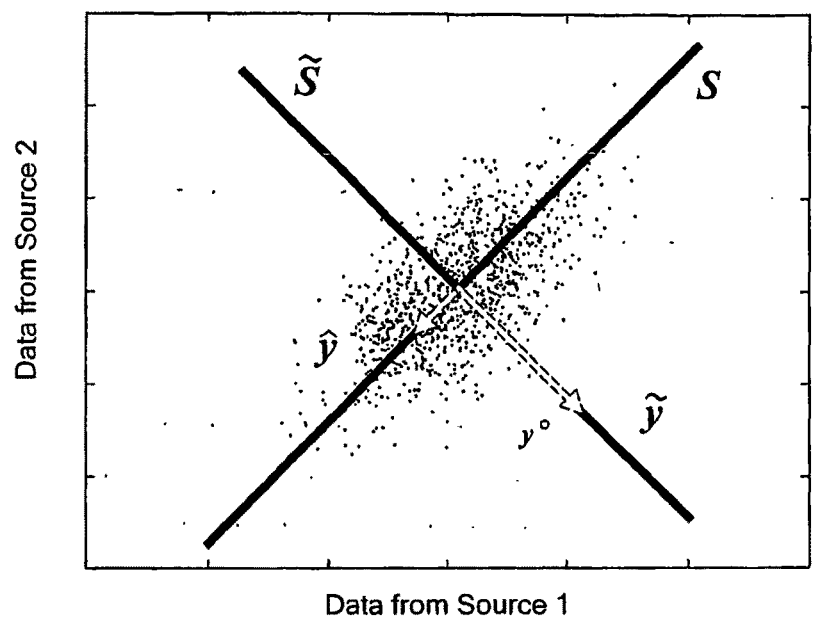
FIG. 2J illustrates data clustering over two dimensions.

The subspace method works by separating the principal axes into two sets, corresponding to normal and anomalous variation in traffic. The space spanned by the set of normal axes is the normal subspace S and the space spanned by the anomalous axes is the anomalous subspace S̃. This is shown in FIG. 2J.

The Ux projection of the data exhibits significant anomalous behavior. Traffic "spike" 230 indicates unusual network conditions, possibly induced by an anomaly. The subspace method treats such projections of the data as belonging to the anomalous subspace.

A variety of procedures can be applied to separate the two types of projections into normal and anomalous sets. Based on examining the differences between typical and atypical projections a simple threshold-based separation method works well in practice. The separation procedure examines the projection on each principal axis in order, maximum spread to minimum spread as would be expected. As soon as a projection is found that exceeds the threshold (e.g., contains a 3σ deviation from the mean), that principal axis and all subsequent axes are assigned to the anomalous subspace. All previous principal axes then are assigned to the normal subspace. This procedure results in placing early principal components in the normal subspace.

Having separated the space of all possible link traffic measurements into the subspaces S and S̃, the traffic on each link is decomposed into its normal and anomalous components.

The methods used for detecting and identifying volume anomalies draw from theory developed for subspace-based fault detection in multivariate process control.

Detecting volume anomalies in link traffic uses the separation of link traffic y at any timestep into normal and anomalous components. These as the modeled and residual parts of y.

In the subspace-based detection step, once S and S̃ have been constructed, this separation can be effectively performed by forming the projection of link traffic onto these two subspaces. The set of link measurements at a given point in time y is decomposed:

$$y = \hat{y} + \tilde{y} \quad (4)$$

such ŷ that corresponds to modeled and ỹ to residual traffic. It is possible to form ŷ by projecting y onto S, and ỹ by projecting y onto S̃.

The set of principal components corresponding to the normal subspace (v1, v2, . . . , vr) is arranged as columns of a matrix P of size m×r where r denotes the number of normal axes k. ŷ and ỹ are:

$$\hat{y} = PP^T y = Cy \text{ and } \tilde{y} = (I - PP^T)y = \tilde{C}y \qquad (5)$$

where the matrix $C = PP^T$ represents the linear operator that performs projection onto the normal subspace S, and $\tilde{C}$ likewise projects onto the anomaly subspace S̃.

Thus, ŷ contains the modeled traffic and ỹ the residual traffic. In general, the occurrence of a volume anomaly will tend to result in a large change to ỹ.

A useful statistic for detecting abnormal changes in ỹ is the squared prediction error (SPE):

$$SPE = \|\tilde{y}\|^2 = \|\tilde{C}y\|^2 \qquad (6)$$

network traffic is normal if $$SPE \le \delta_\alpha^2 \qquad (7)$$

where $\delta_\alpha^2$ denotes the threshold for the SPE at the $1-\alpha$ confidence level. A statistical test for the residual vector known as the Q-statistic given as:

$$\delta_\alpha^2 = \phi_1 \left[ \frac{c_\alpha \sqrt{2\phi_2 h_0^2}}{\phi_1} + 1 + \frac{\phi_2 h_0(h_0 - 1)}{\phi_1^2} \right]^{\frac{1}{h_0}} \qquad (8)$$

where $$h_0 = 1 - \frac{2\phi_1 \phi_3}{3\phi_2^2}, \text{ and } \phi_i = \sum_{j=r+1}^{m} \lambda_j^i; \text{ for } i = 1, 2, 3 \qquad (9)$$

and where $\lambda j$ is the variance captured by projecting the data on the j-th principal component ($\|Yv_j\|^2$), and $c\alpha$ is the $1-\alpha$ percentile in a standard normal distribution. The result holds regardless of how many principal components are retained in the normal subspace.

In this setting, the $1-\alpha$ confidence limit corresponds to a false alarm rate of $\alpha$, if the assumptions under which this result is derived are satisfied. The confidence limit for the Q-statistic is derived under the assumption that the sample vector y follows a multivariate Gaussian distribution. However, it is pointed out that the Q-statistic changes little even when the underlying distribution of the original data differs substantially from Gaussian.

In the subspace framework, a volume anomaly represents a displacement of the state vector y away from S. The particular direction of the displacement gives information about the nature of the anomaly. The approach to anomaly identification is to ask which anomaly out of a set of potential anomalies is best able to describe the deviation of y from the normal subspace S.

The set of all possible anomalies is (Fi, i=1, . . . , I). This set should be chosen to be as complete as possible, because it defines the set of anomalies that can be identified.

For simplicity of illustration, only one-dimensional anomalies are considered; that is, anomalies in which the additional per-link traffic can be described as a linear function of a single variable. It is straightforward to generalize the approach to multi-dimensional anomalies as shown infra.

Then each anomaly $F_i$ has an associated vector $\theta_i$ which defines the manner in which this anomaly adds traffic to each link in the network. Assuming that $\theta_i$ has unit norm, then in the presence of anomaly $F_i$, the state vector y is represented by $$y = y^* + \theta_i f_i \qquad (10)$$

where y* represents the sample vector for normal traffic conditions (and which is unknown when the anomaly occurs), and $f_i$ represents the magnitude of the anomaly.

Given some hypothesized anomaly $F_i$, form an estimate of y* by eliminating the effect of the anomaly, which corresponds to subtracting some traffic contribution from the links associated with anomaly $F_i$. The best estimate of y* assuming anomaly $F_i$ is found by minimizing the distance to the normal subspace S in the direction of the anomaly:

$$f_i = \underset{f_i}{\arg\min} \|\tilde{y} - \tilde{\theta}_i f_i\| \qquad (11)$$

where $\tilde{y} = \tilde{C}y$ and $\tilde{\theta}_i = \tilde{C}\theta_i$. This gives $f_i = (\tilde{\theta}_i^T \tilde{\theta}_i)^{-1} \tilde{\theta}_i^T \tilde{y}$
Thus the best estimate of y* assuming anomaly $F_i$ is:

$$\begin{aligned} y_i^* &= y - \theta_i \hat{f}_i \ldots \\ &= y - \theta_i (\tilde{\theta}_i^T \tilde{\theta}_i)^{-1} \tilde{\theta}_i^T y \ldots \\ &= \left( I - \theta_i (\tilde{\theta}_i^T \tilde{\theta}_i)^{-1} \tilde{\theta}_i^T \tilde{C} \right) y \end{aligned} \qquad (12)$$

To identify the best hypothesis from the set of potential anomalies, chose the hypothesis that explains the largest amount of residual traffic. That is, chose the Fi that minimizes the projection of y*$_i$ onto S̃.

Thus, in summary, the identification algorithm consists of:
1. for each hypothesized anomaly Fi, i=1, . . . , I, compute y*$_i$ using Equation (1)
2. choose anomaly Fj as j=arg min$_i \|\tilde{C}y^*_i\|$.

The possible anomalies are (Fi, i=1, . . . , n) where n is the number of OD flows in the network. In this case, each anomaly adds (or subtracts) an equal amount of traffic to each link it affects. Then $\theta_i$ is defined as column i of the routing matrix A, normalized to unit norm: $\theta i = Ai/\|Ai\|_∞$.

With an estimate of the particular volume anomaly, Fi, the number of bytes that constitute this anomaly are estimated. The estimated amount of anomalous traffic on each link due to the chosen anomaly Fi is given by $$y' = y + y^*_i \qquad (13)$$

Then the estimated sum of the additional traffic is proportional to $\theta_i^T y'$. Since the additional traffic flows over multiple links, one must normalize by the number of links affected by the anomaly.

In the current case, where anomalies are defined by the set of OD flows, our quantification relies on A. We use A to denote the routing matrix normalized so that each column of A has unit sum, that is:

$$\overline{A}_i = \frac{A_i}{\sum A_i} \qquad (14)$$

Then given identification of anomaly Fi, our quantification estimate is:

$$\overline{A}_i^T y' \qquad (15)$$

Some anomalies may lie completely within the normal subspace S and so cannot be detected by the subspace method. Formally, this can occur if $\tilde{C}\theta_i=0$ for some anomaly $F_i$. In fact this is very unlikely as it requires the anomaly and the normal subspace S to be perfectly aligned. However, the relative relationship between the anomaly $\theta_i$ and the normal subspace can make anomalies of a given size in one direction harder to detect than in other directions.

The principles described above are used in another aspect of the invention to produce a multi-feature (multi-way), multi source (multivariate) distribution of traffic flow data. The process begins in step 310 of FIG. 3A by collecting data over multiple features of a whole network and for multiple sources. In step 340 the data is organized in a 3D matrix form, an example of such being shown in FIG. 3C. Here a series of matrices 332 are formed, one for each feature. The matrix form has source, OD pairs or links presented, one for each column against the number of time periods, one for each row. In the example of the present invention the features are: source IP, source port, destination IP and destination port. Other or less features may be used as well.

Figure 3A:
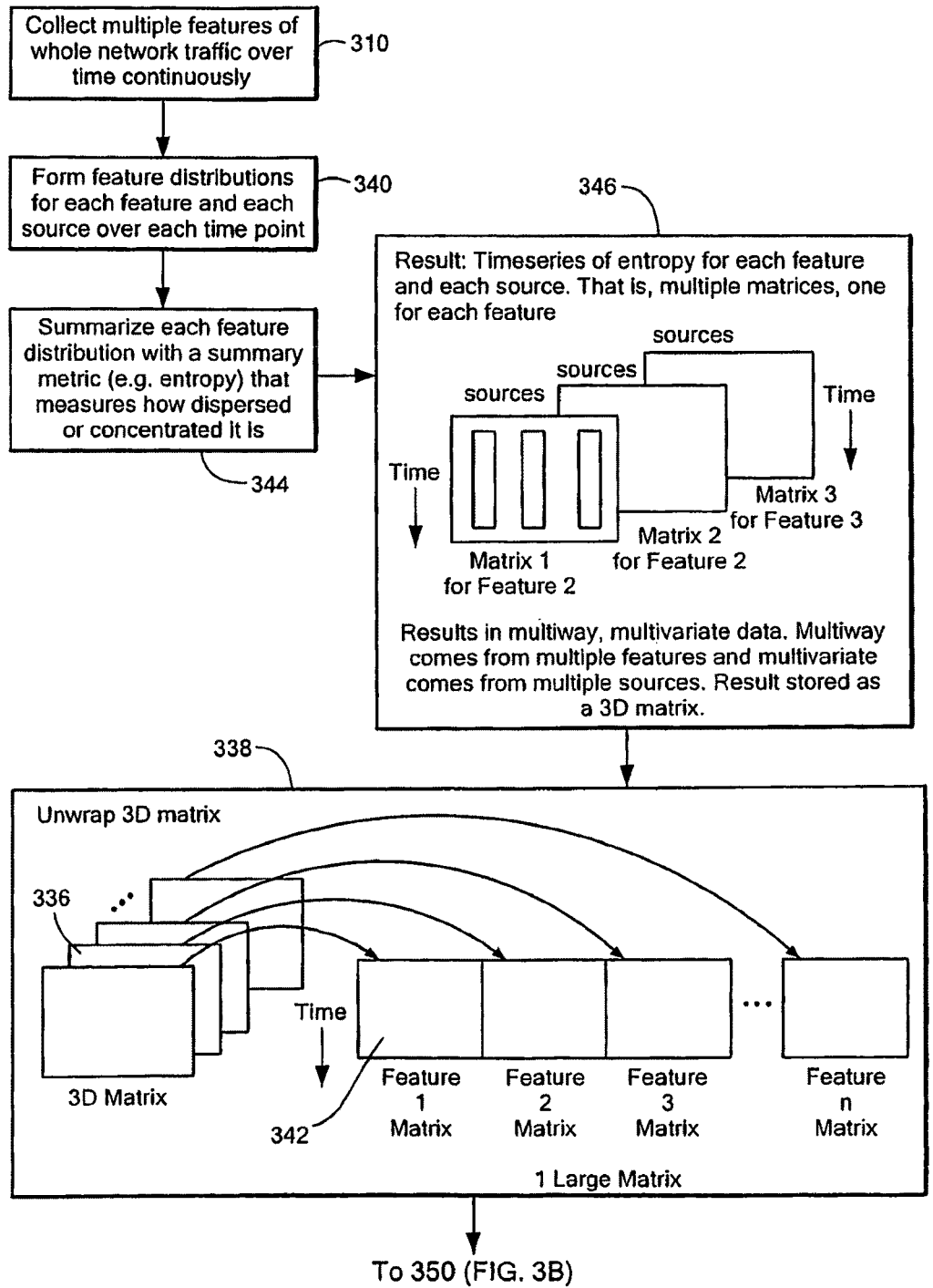
FIGS. 3A-3B illustrate processing on network data according to a further aspect of the invention.
Figure 3B:
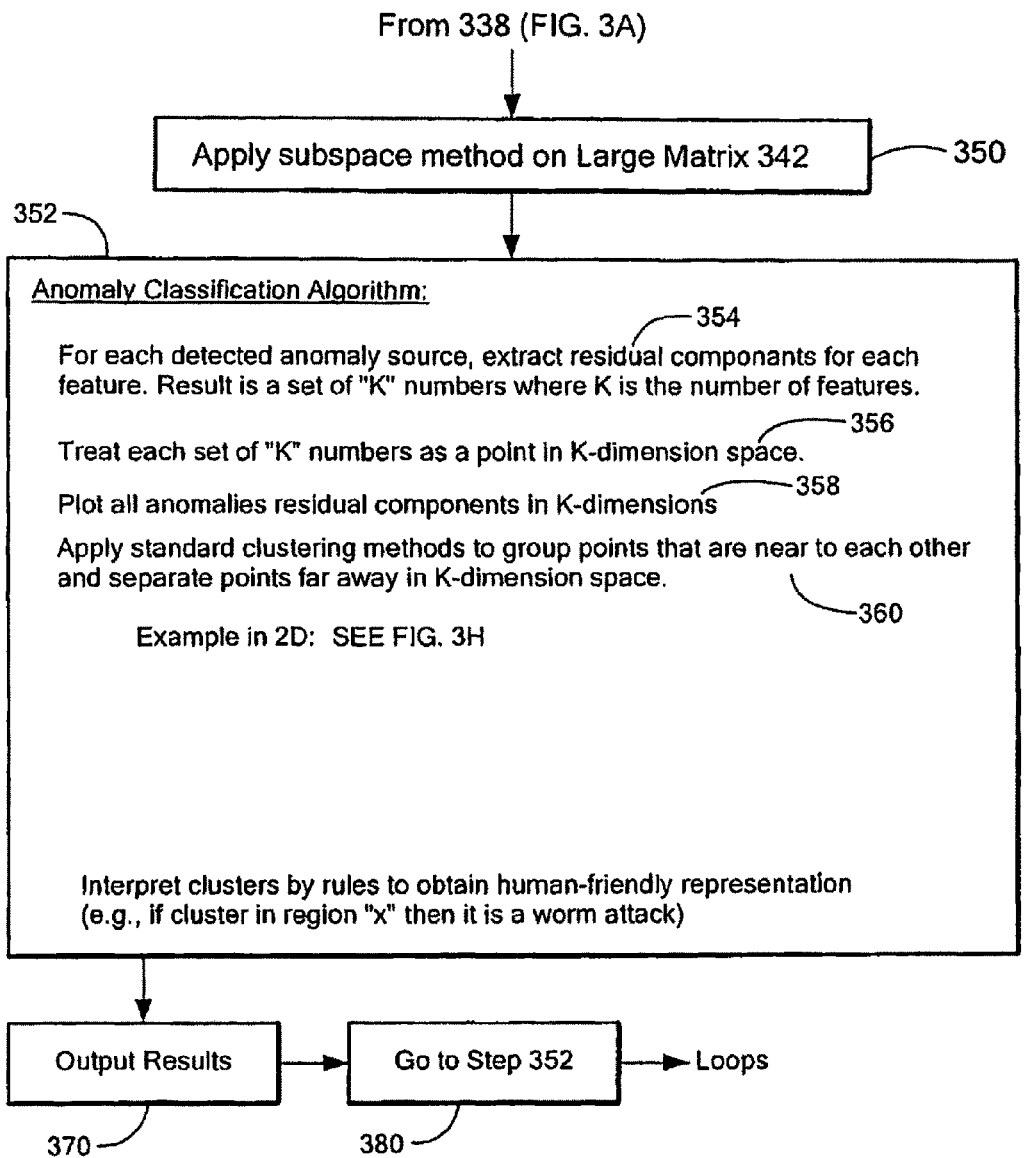
Figure 3C:
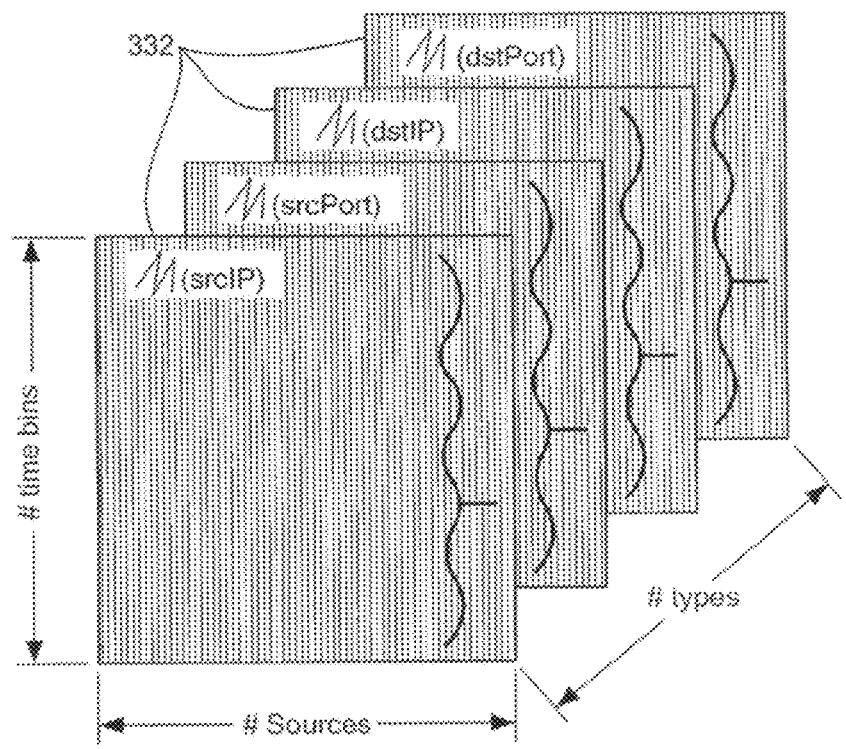
FIG. 3C illustrates a multi-dimensional matrices of date for plural features created in using the invention.
Figure 3D:
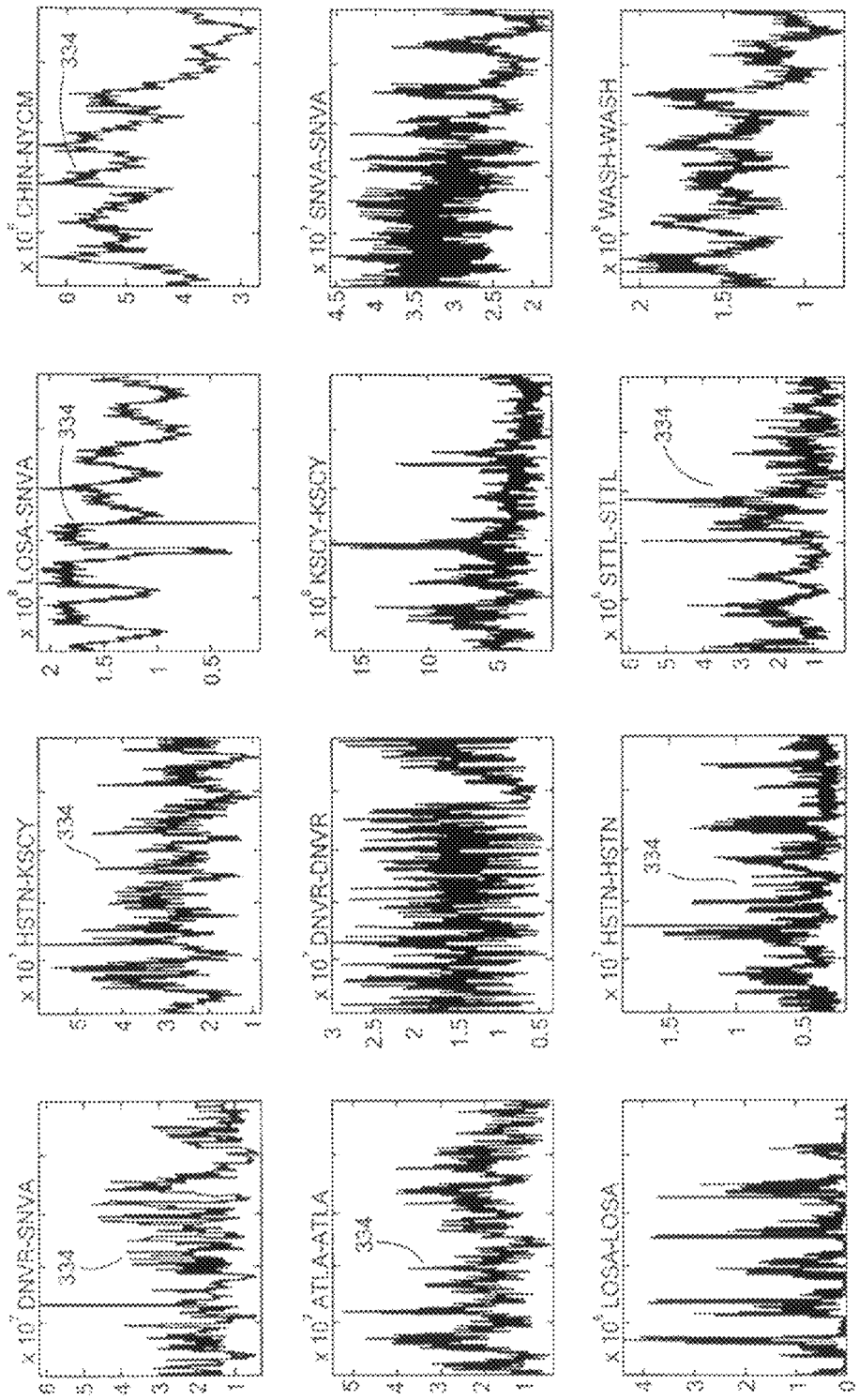
FIG. 3D illustrates matrix contents for the matrices of FIG. 3C.

FIG. 3D shows a set of data for, each matrix element, meaning that the matrices 332 are in fact three dimensional, each matrix position having a series of data points 334. It thus resembles the matrices above showing source v. time period data.

In a step 344 of FIG. 3A this data is reduced statistically by a process of characterizing each feature distribution, in this example, an entropy metric, giving the results of state 346. There results a set of 3D matrices 336 shown in FIG. 3G. discussed below. An entropy metric processes each data point using the formula:

$$H(x) = \sum_{i=1}^{N} \left(\frac{ni}{s}\right) \log_2 \left(\frac{ni}{s}\right) \quad (16)$$

Here i occurs $n_i$ times and S is the total number of observations in the matrix. The new matrices 336, in FIG. 3G and in state 360 have 3D character as well.

Figure 3E:
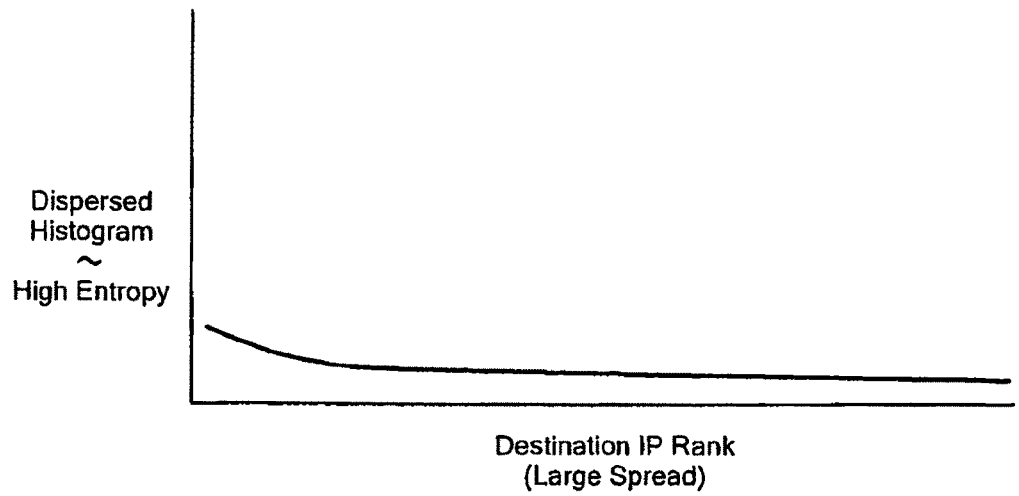
FIGS. 3E-3F illustrate the results of using an entropy metric according to the invention.
Figure 3F:
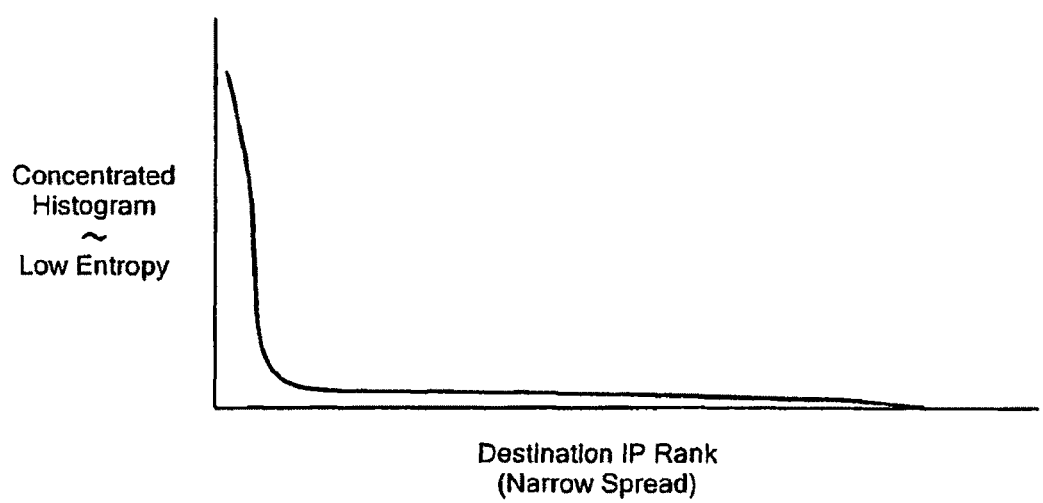

The process of statistical simplification of two different distributions by an entropy metric is illustrated in FIGS. 3E and 3F, illustrating high and low entropy figures. When the distribution histogram is dispersed (FIG. 3E), entropy summarization of the histogram is high. And, when the histogram is skewed or concentrated on a handful of values as in FIG. 3F, the entropy value of the histogram is small.

Figure 3G:
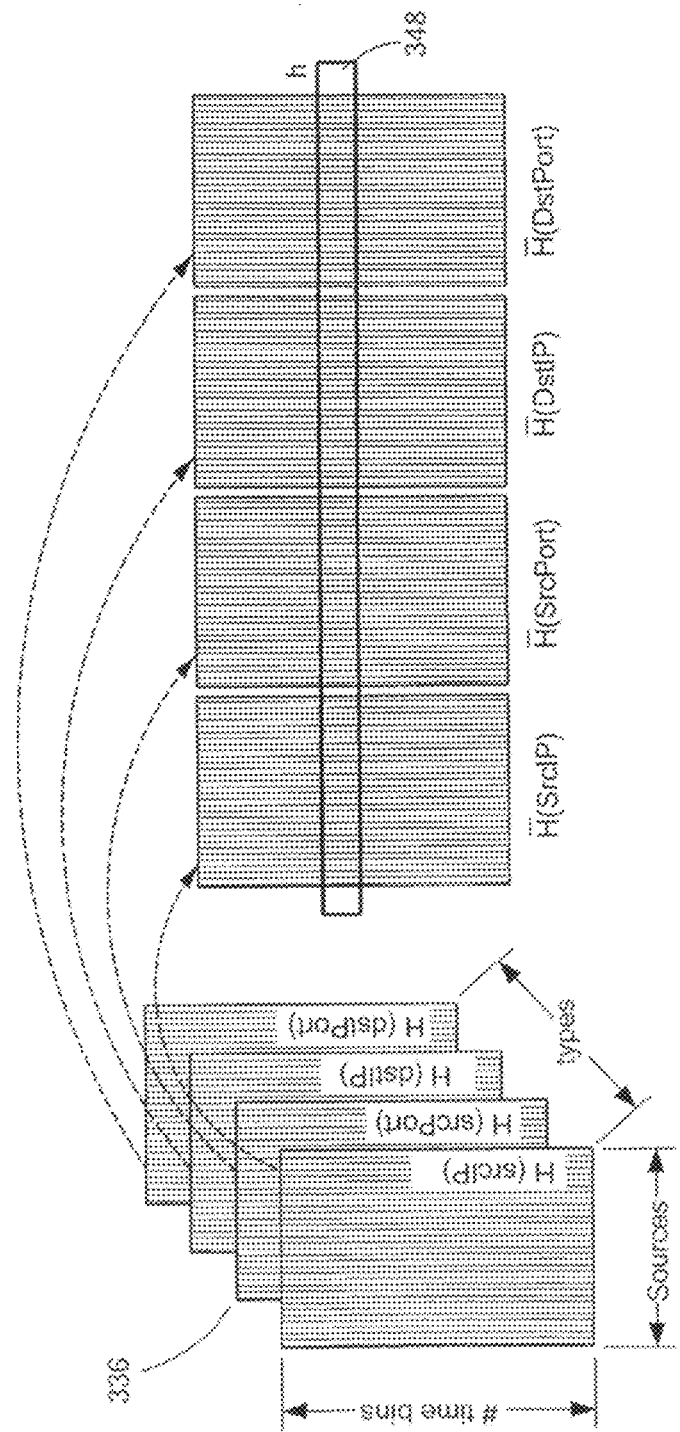
FIG. 3G illustrates the matrix unwrapping as practiced in the invention.

In subsequent step 338, the matrices 336 are "unwrapped" into a large 2D matrix 342 in which the rows of each matrix 336 are assembled into long rows such as row 348 in FIG. 3G by continuing from feature to feature. In FIG. 3G, the features are in exemplary form the source IP address and port and the destination IP address and port.

The matrix 342 is then processed in step 350 and 352 by a subspace clustering technique on the principles as previously described. This is an iterative process in that it steps repeatedly through the procedures in step 352, looping via steps 370 and 380. The following describes the net result of the iteration.

In a step 354 of an anomaly classification process for each detected anomaly the residual components are found for of K each features. A detected anomaly yields a set of "K" numbers, one for each of the features in the matrix 340. The K numbers represent a point in K-dimensional space and is so treated in step 356. That is the K numbers are treated as positions along K axes in K space and they are so plotted in step 358. This plotting occurs in a processor such as such as processor 120 and an associated database.

Clustering techniques are then applied in step 360 to identify clusters of points that are near to each other according to a threshold value for nearness. Such a value for threshold is determined directly from the datapoints and also adjusted over time for more accurate result as a part of a learning from use process. The clustering may be performed in a lower dimensional space such as, for example, projecting them onto a 2D space as in FIG. 3H.

Figures 3H, 3I:
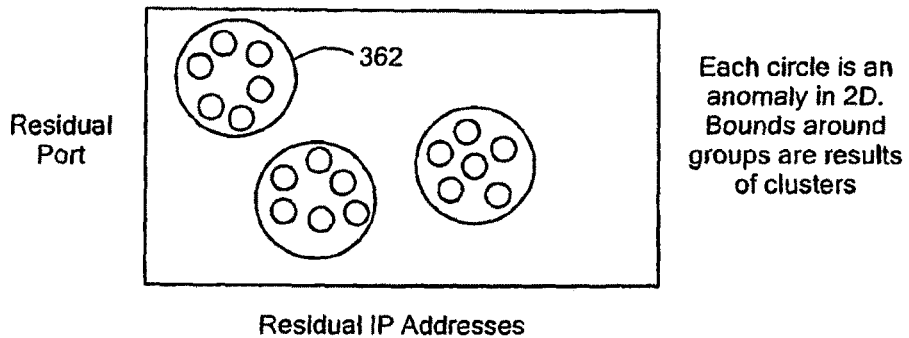
FIG. 3H illustrates the result of clustering as practiced in the invention.
FIG. 3I is an exemplary table for anomaly characterizing according to the invention.

The resulting clusters (an example with K=2 dimensions is shown in 362) as in FIG. 3H, may be interpreted by rules, initially established by knowledge on manual observations to correlate a region with a human-friendly description of an anomaly. An example is: "an anomaly that falls in the region of high residual destination IP entropy and low residual destination port entropy is a worm scan". FIG. 3I shows a table of actual data obtained by evaluation of this invention on real network traffic and its interpretation. The table shows for the four features described above how the entropy metric level (− being low and + being high) defines clustering locations that are interpreted as a variety of anomaly types (Plurality of Labels) shown in the figure. This allows anomaly classification to be accomplished when location is added as a feature during clustering the present invention allows simultaneous classification and localization. Other anomaly types that can be separated include: content distributions, routing loops, traffic engineering, overloads. The invention can spot other anomalies than those above or than previously known using the clustering based approach. This provides an unsupervised learning approach to identifying new network anomaly types.

In this manner various service providers for networks (e.g., Service provider networks or cable providers) that subscribe to or use the invention may be able to take remedial steps to deal with anomalies and provide assurances to their subscribers of that ability. This will potentially make their service more appealing. The providers may also contract this function to independent analysts by giving them the necessary access to network elements, thereby creating a new business opportunity.

The invention has been illustrated for use in service provider networks but can equally be used in other types of networks such as transportation highway networks, postal service networks, and sensor networks.

What is claimed is:

1. A method for detecting anomalies in network traffic, the method comprising:

during at least one training interval, collecting network traffic data comprising data from N network sources at a plurality of time periods t, where N>1;

assigning, by a processor, the network traffic data collected during the at least one training interval from the N network sources to dimensions of an r-dimensional subspace, wherein 0<r≤N and each of the dimensions r corresponds to a degree of variance of the data along an orthogonal dimension of the r-dimensional subspace;

computationally analyzing the r-dimensional subspace to identify dimensions corresponding to a normal subspace S1 thereof, the dimensions of the normal subspace S1 containing only data corresponding to normal network traffic of the network traffic data collected during the at least one training interval;

computationally defining an anomalous subspace S2 by removing dimensions corresponding to the normal subspace S1 from dimensions corresponding to the r-dimensional subspace, the anomalous subspace S2 representing behavior of anomalous network traffic in the network traffic data;

during an operational time interval, receiving network data traffic and computationally projecting the network traffic data received during the operational time interval onto the anomalous subspace S2 to create a projection representing a degree of anomalous variation in the received network data traffic; and based on the projection, classifying the network traffic data received during the operational time interval as anomalous if the degree of anomalous variation exceeds a threshold.

2. The method of claim 1, further comprising identifying a normal susbspace S1 by assigning a first k dimensions of maximum variance in the r-dimensional subspace to the normal subspace S1, and wherein defining the anomalous subspace S2 comprises assigning a remaining r-k dimensions in the r-dimensional subspace R to the anomalous subspace S2.

3. The method of claim 2, wherein (i) the normal subspace S1 comprises dimensions having a deviation from a mean less than a threshold and (ii) the anomalous subspace S2 comprises dimensions having a deviation from a mean greater than a threshold.

4. The method of claim 3, wherein the threshold comprises a three-sigma deviation from a mean.

5. The method of claim 1, further comprising evaluating the anomalous network source to determine its source, time, number of bytes, or number of packets.

6. The method of claim 1, wherein the degree of anomalous variation is measured using a Q-statistic and wherein the threshold comprises a confidence level of 1−α, wherein α comprises a false-alarm rate.

7. The method of claim 1, further comprising identifying at least one of the N network sources as anomalous at time t.

8. The method of claim 7, wherein identifying the at least one of the N network sources as anomalous comprises selecting the one or more one N network sources that contribute the most to the anomalous traffic at time period t.

9. A system for detecting anomalies in network traffic, the system comprising:
　a database for collecting, during at least one training interval, network traffic data comprising data from N network sources at a plurality of time periods t, where N>1; and
　a computer processor configured for:
　　(i) assigning, by a processor, the network traffic data collected during the at least one training interval from the N network sources to dimensions of an r-dimensional subspace, wherein 0<r≤N and each of the dimensions r corresponds to a degree of variance of the data along an orthogonal dimension the r-dimensional subspace;
　　(ii) computationally analyzing the r-dimensional subspace to identify dimensions corresponding to a normal subspace S1 thereof, the dimensions of the normal subspace S1 containing only data corresponding to normal network traffic of the network traffic data collected during the at least one training interval;
　　(iii) computationally defining an anomalous subspace S2 by removing dimensions corresponding to the normal subspace S1 from dimensions corresponding to the r-dimensional subspace, the anomalous subspace S2 representing behavior of anomalous network traffic in the network traffic data;
　　(iv) during an operational time interval, receiving network data traffic and computationally projecting the network traffic data received during the operational time interval onto the anomalous subspace S2 to create a projection representing a degree of anomalous variation in the received network data traffic; and
　　(v) based on the projection, classifying the network traffic data received during the operational time interval as anomalous if the degree of anomalous variation exceeds a threshold.

10. The system of claim 9, wherein the network traffic data comprises data from a communications network.

11. The system of claim 9, wherein the network sources comprise routers or servers.

12. The system of claim 9, wherein the network traffic data is stored in a matrix data structure in a computer memory.

13. The system of claim 9, wherein the processor is further configured for evaluating the anomalous network source to determine its source, time, number of bytes, or number of packets.

14. The system of claim 9, wherein the processor is further configured for identifying at least one of the N network sources as anomalous at time t.

* * * * *